US012690114B2

(12) United States Patent
Yu

(10) Patent No.: US 12,690,114 B2
(45) Date of Patent: Jul. 21, 2026

(54) INTEGRATED POWER CONTROLLER FOR LED SYSTEM

(71) Applicant: LEDup Manufacturing Group Limited, Irwindale, CA (US)

(72) Inventor: Jing Jing Yu, Irwindale, CA (US)

(73) Assignee: LEDuo Manufacturing Group Limited, Irwindale, CA (US)

( * ) Notice: Subject to any disclaimer, the term of this patent is extended or adjusted under 35 U.S.C. 154(b) by 36 days.

(21) Appl. No.: 18/673,008

(22) Filed: May 23, 2024

(65) Prior Publication Data

US 2025/0016901 A1 Jan. 9, 2025

Related U.S. Application Data

(60) Provisional application No. 63/525,017, filed on Jul. 5, 2023.

(51) Int. Cl.

*H05B 47/19* (2020.01)
*H05B 45/10* (2020.01)
*H05B 45/20* (2020.01)
*H05B 47/175* (2020.01)

(52) U.S. Cl.

CPC ............. *H05B 47/19* (2020.01); *H05B 45/10* (2020.01); *H05B 45/20* (2020.01); *H05B 47/196* (2024.01)

(58) Field of Classification Search

CPC ...... H05B 47/19; H05B 47/196; H05B 45/10; H05B 45/20

See application file for complete search history.

(56) References Cited

U.S. PATENT DOCUMENTS

| | | | | |
|---|---|---|---|---|
| 2014/0077723 | A1* | 3/2014 | Ahern | H05B 47/17 315/291 |
| 2015/0015165 | A1* | 1/2015 | Engelen | H05B 47/19 315/294 |
| 2016/0044761 | A1* | 2/2016 | Ahern | G10H 1/00 315/294 |
| 2022/0196231 | A1* | 6/2022 | Yu | F21V 23/06 |
| 2023/0380040 | A1* | 11/2023 | Reiss | F21S 2/00 |
| 2023/0397317 | A1* | 12/2023 | Karc | H02J 13/00 |

* cited by examiner

*Primary Examiner* — Raymond R Chai

(74) *Attorney, Agent, or Firm* — William W. Cochran; Cochran Freund & Young LLC

(57) ABSTRACT

Disclosed is a wireless integrated lighting control system and a wireless processer control lighting system that are capable of illumination of LED light displays, LED ornaments, and pre-lit Christmas trees. Various programs and sequences can be provided to an integrated power controller or an integrated power processor controller using a remote control, a foot switch, and in one embodiment, a programming controller. The integrated power controller and integrated power processor controller can be an integrated system having electrical socket blades that are adapted to be plugged into a wall outlet to obtain power and can be made waterproof for use outside.

19 Claims, 4 Drawing Sheets

INTEGRATED POWER CONTROLLER FOR LED SYSTEM

CROSS-REFERENCE TO RELATED APPLICATIONS

The present U.S. Utility Patent Application claims priority pursuant to 35 U.S.C. § 119(e) to U.S. Provisional Application No. 63/525,017, entitled, "INTEGRATED POWER CONTROLLER FOR LED SYSTEM," filed on Jul. 5, 2023, which is incorporated herein by reference for all that it discloses and teaches and is made part of the present U.S. Utility Patent Application for all purposes.

BACKGROUND OF THE INVENTION

LED systems have been used to provide decorative lighting in numerous applications. Also, there has been widespread use of LED lighting systems in commercial applications. Control systems for controlling LED lights have become more advanced and sophisticated. As a result, LED systems have become popular for decorative purposes and other practical applications.

SUMMARY OF THE INVENTION

The present invention may therefore comprise a method of controlling light emitting diodes comprising: generating lighting commands from a remote control device; transmitting the lighting commands wirelessly from the remote control device to a receiver that is connected to a controller in an integrated power controller; generating operational control signals from a foot switch; transmitting the operational control signals wirelessly from the foot switch to the receiver that is connected to the controller in the integrated power controller; connecting power from a power supply to create converted power signals; processing the lighting commands in the controller to create lighting control signals from the converted power signals; processing the operational control signals in the controller to control the lighting control signals; connecting the power supply to electrical socket blades; placing the electrical socket blades, the receiver, the processor, the memory, the controller and the power supply in the integrated power controller that is plugged into a wall socket using the electrical socket blades to obtain power; connecting the integrated power controller to the light emitting diodes to illuminate the light emitting diodes in accordance with the lighting control instructions, the lighting commands and the operational control signals.

The present invention may further comprise a system for controlling illumination of light emitting diodes comprising: a remote control that is configured to create lighting commands; a remote control wireless transmitter that is configured to wirelessly transmit the lighting commands from the remote control; a foot switch that is configured to create operational control signals; a foot switch wireless transmitter that is configured to wirelessly transmit the operational control signals; an integrated power controller comprising: a receiver that is configured to receive the lighting commands and the operational control signals; a power supply connected to an alternating current power signal, the power supply configured to convert the alternating current power signal to a conditioned direct current power signal; a controller that receives the lighting commands and the operational control signals and generates lighting control signals from the converted direct current power signals that control the illumination of the light emitting diodes in accordance with the lighting commands and the operational control signals.

The present invention may further comprise a method of controlling light emitting diodes comprising: generating lighting control instructions from a programming controller; transmitting the lighting control instructions wirelessly from the programming controller to a receiver connected to a processor in a processor controlled integrated power system; generating lighting commands from a remote control device; transmitting the lighting commands wirelessly from the remote control device to the receiver that is connected to the processor in the processor controlled integrated power system; generating operational control signals from a foot switch; transmitting the operational control signals wirelessly from the foot switch to the receiver that is connected to the processor controlled integrated power system; converting power from a power supply to create converted power signals; storing the lighting control instructions in a memory that is connected to the processor; retrieving the lighting control instructions from the memory in response to the lighting commands; processing the lighting control instructions to create lighting control signals that are transmitted from the processor to a controller; controlling application of the converted power signals to the light emitting diodes using the controller that operates in response to the lighting control signals; placing the receiver, the processor, the memory, the controller and the power supply in a processor controlled integrated power system package; connecting the processor controlled integrated power system package to the light emitting diodes to illuminate the light emitting diodes in accordance with the lighting control instructions, the lighting commands and the operational control signals.

The present invention may further comprise a system for controlling illumination of light emitting diodes comprising: a programming controller that is configured to create lighting control instructions; a programming controller wireless transmitter that is configured to wirelessly transmit the lighting control instructions from the programming controller; a remote control that is configured to create lighting commands; a remote control wireless transmitter that is configured to wirelessly transmit the lighting commands from the remote control; a foot switch that is configured to create operational control signals; a foot switch wireless transmitter that is configured to wirelessly transmit the operational control signals; an integrated power processor controller comprising: a receiver that is configured to receive the lighting control instructions, the lighting commands and the operational control signals; a power supply connected to an alternating current signal that is configured to convert the alternating current signal to a converted direct current power signal; a memory that stores the lighting control instructions; a processor that is configured to retrieve the lighting control instructions from the memory in response to the lighting commands or the operational control signals, and generate processed lighting command and instruction signals; a controller that receives the processed lighting command and instruction signals and generates lighting control signals from the converted direct current power signals in response to the processed lighting command signals.

DETAILED DESCRIPTION OF THE EMBODIMENTS

Figure 1:
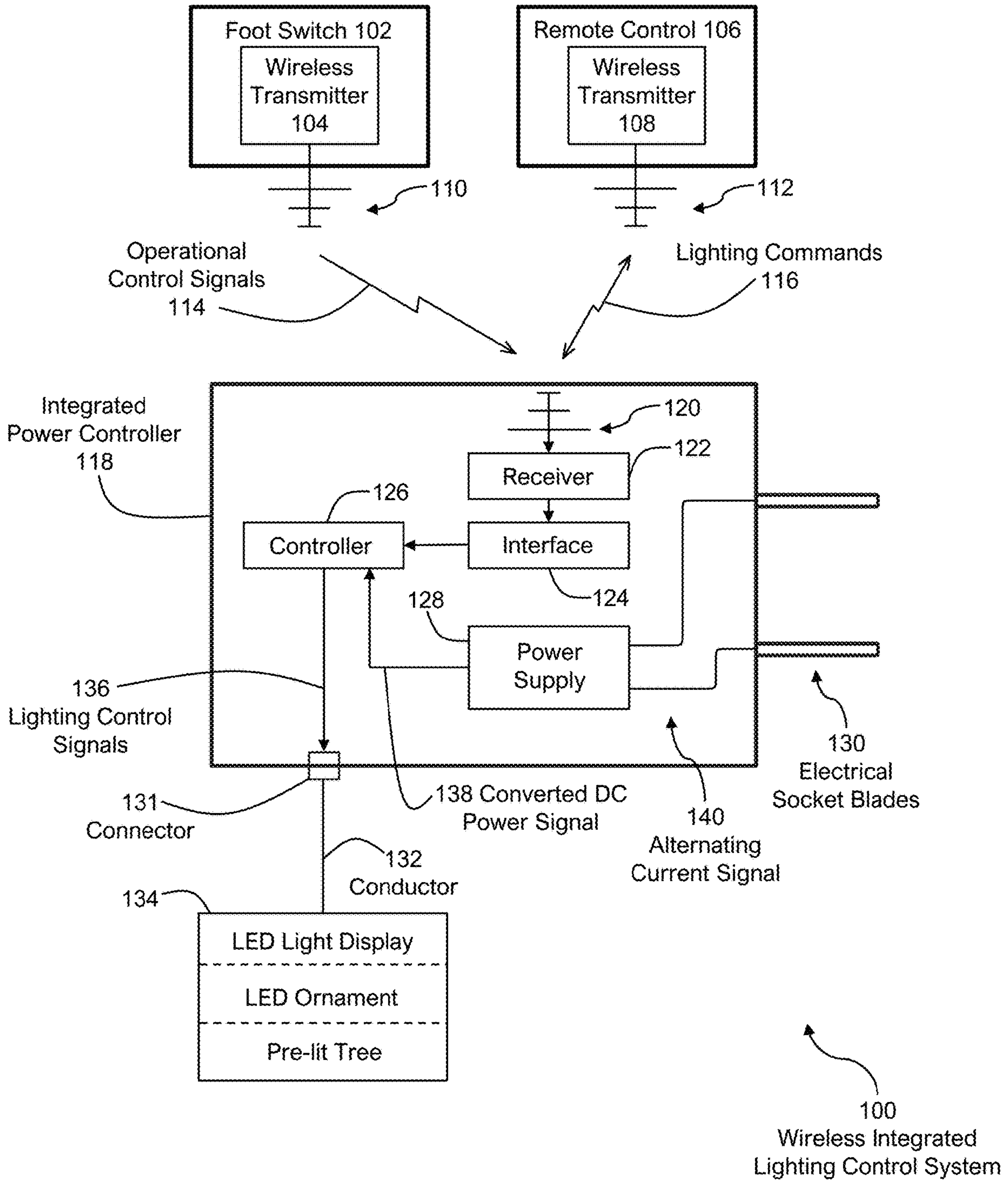
FIG. 1 is a schematic block diagram of an embodiment of a wireless integrated lighting control system.

FIG. 1 is a schematic block diagram of a wireless integrated lighting control system 100. As illustrated in FIG. 1, a foot switch 102 includes a wireless transmitter 104 that is connected to antenna 110. Antenna 110 transmits operational control signals 114 that are transmitted to antenna 120 of the integrated power controller 118. The operational control signals 114 can be control signals such as on, off signals that control the integrated power controller 118. Other types of signals can also be generated to control the integrated power controller 118, such as control signals to switch from one sequence of illumination, color, fading, blinking, or other operational processes. Remote control 106 also includes a wireless transmitter 108 that transmits lighting commands 116 through antenna 112 to antenna 120 of the integrated power controller 118. The operational control signals 114 and lighting commands 116 received by antenna 120 are transmitted to the receiver 122 that receives and amplifies the wireless signals. These amplified signals are then transmitted to an interface 124. The operating control signals and lighting command signals 116 are received by controller 126 via receiver 122 and interface 124. Power supply 128 receives alternating current signal 140 from the electrical socket blades 130, that are plugged into a standard wall socket. Power supply 128 generates a converted direct current (DC) power signal 138 that is converted from the alternating current signal 140. The alternating current 140 is normally a 117 volts rms signal. Power supply 128 may convert the alternating current signal to a converted DC power signal 138, having the proper voltage for illuminating the light emitting diodes.

As set forth above, interface 124 provides signals corresponding to the lighting commands 116 and operational control signals 114 to the controller 126. The lighting commands 116 may cause controller 126 to generate a lighting signal 136 that causes the LEDs to blink or flash at a certain rate or cause fading or color change using current reversal or phase changes. This may occur in various sequences. Various types of LEDs such as a LED light display, a LED ornament, or a pre-lit tree may comprise the LEDs indicated by reference numeral 134. The various LEDs 134 are connected to the controller 126 through connector 131 and conductor 134. In this manner, the remote control 106 and foot switch 102 can wirelessly control the LEDs, such as LED light displays, LED ornaments, pre-lit trees or other LED illumination devices.

Figure 2:
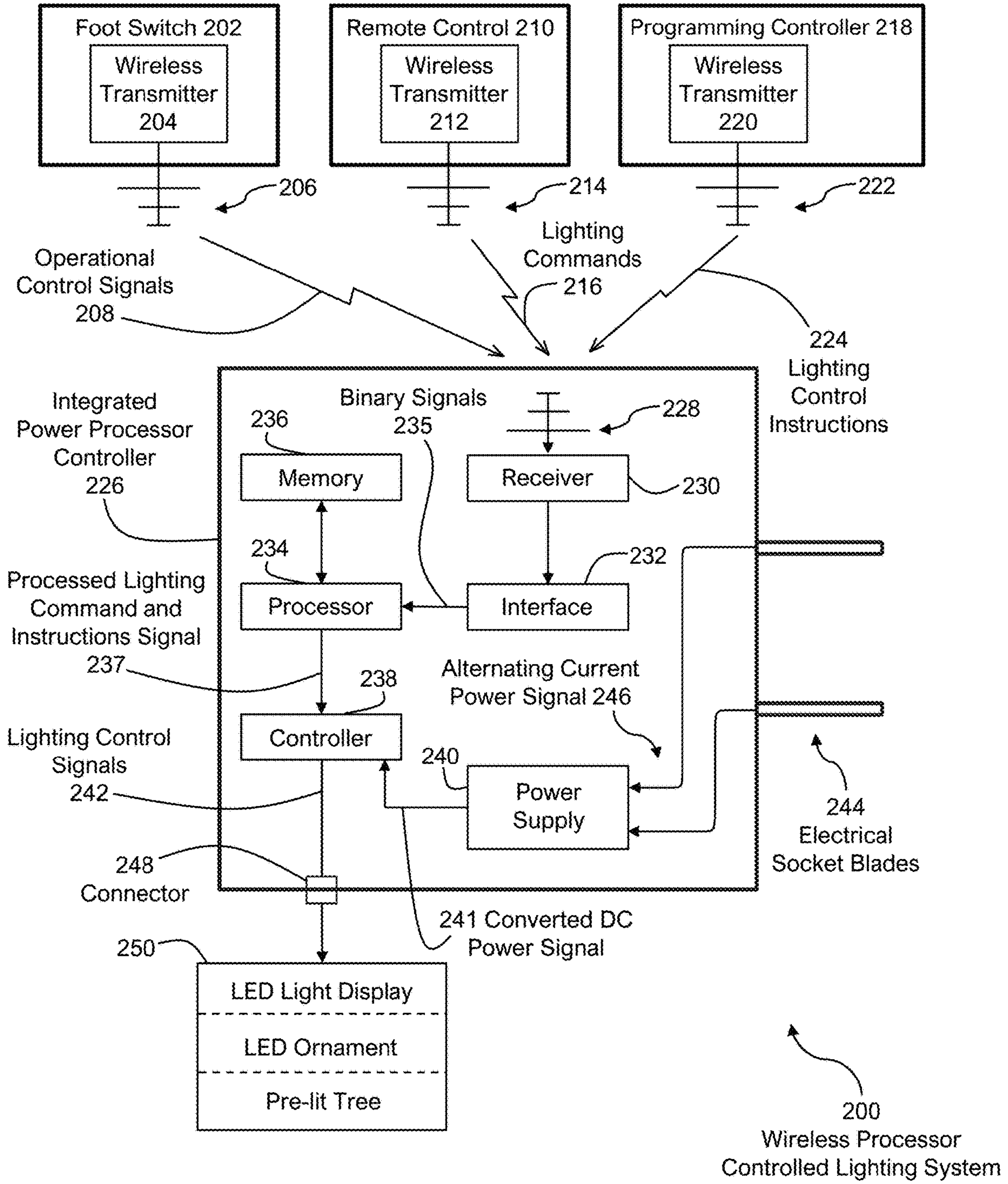
FIG. 2 is a schematic block diagram of another embodiment of a wireless processor controlled lighting system.

FIG. 2 is a schematic block diagram of another embodiment, which comprises a wireless processor controlled lighting system 200. As illustrated in FIG. 2, foot switch 202 includes wireless transmitter 204 that transmits operational control signals 208 through antenna 206 to antenna 228 of the integrated power processor controller 226. The operational control signals 208 may comprise on and off signals, or signals that control the selection of various sequences of illumination, color changes, fading, blinking or other effects created in the LEDs 250. As also illustrated in FIG. 2, remote control 210 includes wireless transmitter 212 which transmits lighting commands 216 through antenna 214 to antenna 228 of the processor controlled integrated power system 226. The lighting commands 216 select certain sequences or operational characteristics for the manner in which LEDs, such as LED light display, LED ornament, or pre-lit tree 250, are illuminated, including illumination sequences, color changes, fading, blinking and other effects and sequences of effects produced in the LEDs 250.

Programming controller 218, illustrated in FIG. 2, includes wireless transmitter 220 that transmits lighting control instructions 224 from antenna 222 to antenna 228 of the integrated power processor controller 226. The lighting control instructions 224 are lighting instructions that are stored in memory 236 which comprise processes and sequences in which the processor 234 generates processed lighting command and instruction signals 255. The operational control signals 208, the lighting commands 216, and the lighting control instructions 224 received by the receiver 230 are filtered, amplified, and transmitted to the interface 232. Interface 232 creates binary signals 235 that are transmitted to the processor 234. The processor receives the binary signals 235 and generates processed lighting command and instruction signals 237 that are supplied to controller 238 to instruct the controller 238 as to the generation of lighting control signals 242. The lighting commands, which may comprise, in part or in whole, the processed lighting command and instruction signals 237, may instruct the processor to turn off or turn on the LEDs 250. Another command signal may instruct the processor to proceed to a subsequent sequence of lighting effects of the processor by the lighting control instructions 224. Lighting control instructions 224, which may comprise, in part or in whole, the processed lighting command and instruction signals 237, comprise instructions that are used to control the sequences and processes of the illumination of the LEDs in the LED light display, LED ornament, or pre-lit tree illustrated by reference numeral 250. For example, the programming controller 218 creates lighting control instructions 224 which are stored in memory 236 and retrieved by processor 234 in response to a lighting command signal 216, to cause a processor 234 to instruct the controller 238 to produce color change and fading between color change. Other processes include blinking and flashing of the LEDs in response to lighting signals 242. Operational control signals 208 can cause the processor to switch between lighting control instructions 224. Power supply 240 conditions the alternating current power signal 246 from the electrical socket blades 244 to provide proper illumination of the LEDs. For example, a 5V DC signal may be created at the output of power supply 240 from an AC 117 volts rms alternating current signal.

Any number of different programs and sequences can be transmitted by the programming controller 218 and stored in the memory 236 which can be retrieved by remote control 210 from memory 236. Flashing, fading, or color change, to a LED light display, a LED ornament, or a LED pre-lit tree, can be achieved using the stored programs in memory 236. In this manner, the wireless processor controlled lighting system 200 can create numerous different lighting sequences to produce a variety of illumination projections from LED light displays, LED ornaments, or LED pre-lit trees 250. In addition, integrated power processor controller 226 is a single package that can be made waterproof so that it can be used outside.

Figure 3:
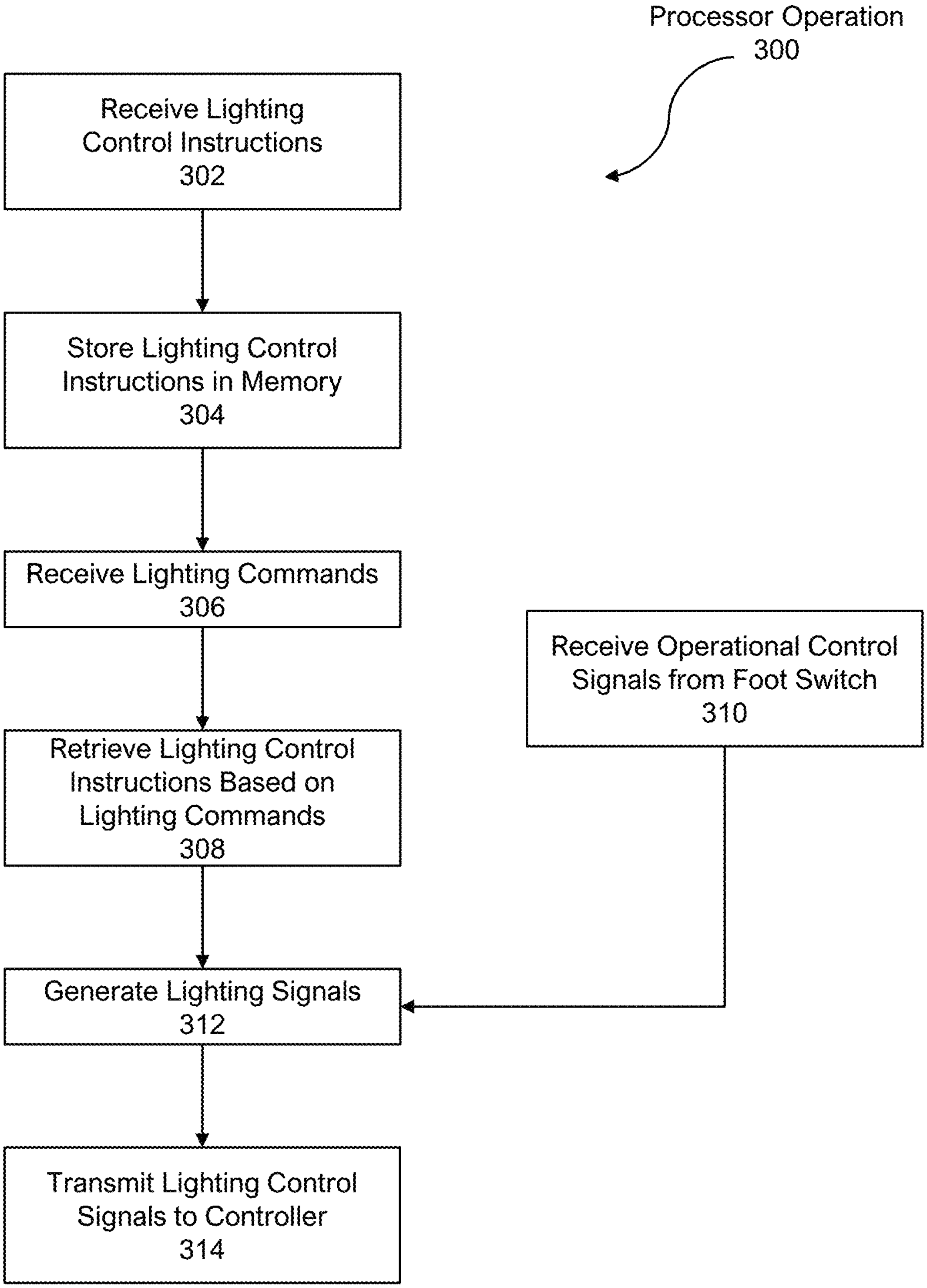
FIG. 3 is a flowchart illustrating the operation of the processor of FIG. 2.

FIG. 3 is a schematic flow diagram illustrating the processor operation 300. At step 302, the processor 234 receives lighting control instructions 224 from the programming controller 218 of FIG. 2, as described with respect to FIG. 2. These lighting control instructions 224 provide various programs and sequences of illumination intensities, color change, and other illumination implementations. These lighting control instructions 224 are then stored in the memory 236 for later retrieval by processor 234 in response to lighting commands 216 at step 304. Processor 234 then receives lighting commands at step 306. These lighting commands are received from interface 232 in receiver 230 from the remote control 210 and changed to binary signals 235. At step 308, the processor retrieves lighting control instructions 224 based on, and in some cases, in response to, the lighting commands 216 received by processor 234 from the remote control 210. At step 312, the processor generates processed lighting command and instruction signals 237 to illuminate the LEDs at reference numeral 250. At step 310, operational control signals 208 from foot switch 202 are received at the processor 234. These operational control signals 208 can simply instruct controller 238 to turn on and turn off the LEDs 250, or can cause the processor 234 to retrieve the next lighting control instructions 224 from memory 236 and execute those lighting control instructions 224. Sequential operation of the foot switch 202 generates additional operational control signals 208, which cause the processor 234 to retrieve the next subsequent lighting control instruction 224 from memory 236. In this manner, the foot switch 202 can be sequentially activated to activate each of the lighting control instructions 224 stored in memory 236 until the user obtains the desired lighting control instructions that produces the desired display. Once the controller 238 generates the lighting signals 242, in response to the lighting control signals 235, the LED light display, LED ornament, pre-lit tree, or other LED device, illustrated at reference number 250, is connected to connector 248 to receive the lighting control signals 242 and be illuminated in accordance with the lighting control instructions 224 executed by processor 234 at step 314.

Figure 4:
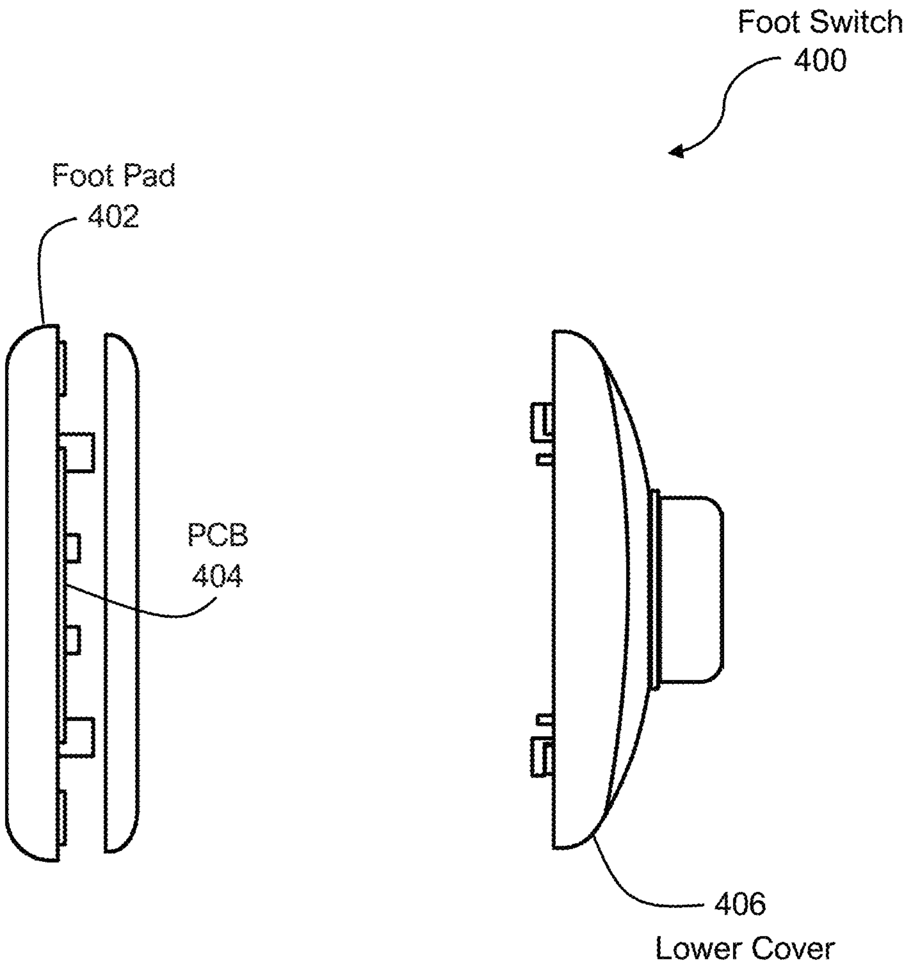
FIG. 4 is a schematic diagram of a foot switch.

FIG. 4 is a schematic, exploded diagram of a foot switch 400. Foot switch 400 includes foot pad 402 and a printed circuit board 404 that is mounted inside of the foot switch 400. The foot switch 400 has a foot pad 402 that is spring mounted to a lower cover 406 for activation of the foot switch 400. When the foot pad 402 is depressed, the spring within the foot switch 400 is compressed and a switch in printed circuit board 404 is activated. Printed circuit board 404 produces the operational control signals 208 (FIG. 2) which are transmitted to the integrated power processor controller 226 (FIG. 2).

As such, the present invention provides an integrated power system which is wireless that may operate with up to three different modules that connect to a processor controlled integrated power system 226 that can be plugged directly into the wall power. A modular foot switch can be used to easily turn the system on and off or sequentially access different lighting sequences. A remote control can also be used to turn the system on and off and access different lighting control processes and sequences. A programming controller 218 can also be used to program different lighting sequences. The programming controller 218 may comprise a computer or phone that can be connected wirelessly, such as through Bluetooth connection, to the integrated power processor controller 226 to program the memory 236 with different lighting functions and controls.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for controlling illumination of light emitting diodes comprising:

a programming controller that is configured to provide lighting control programs, said lighting controlled programs having a plurality of lighting control instructions that control illumination said light emitting diodes;

a programming controller wireless transmitter that is configured to wirelessly transmit said lighting control programs from said programming controller;

a remote control that is configured to create lighting commands;

a remote control wireless transmitter that is configured to wirelessly transmit said lighting commands from said remote control;

a foot switch that is configured to create operational control signals;

a foot switch wireless transmitter that is configured to wirelessly transmit said operational control signals from said foot switch;

a processor controlled integrated power system comprising:

a receiver that is configured to receive said lighting controlled programs, said lighting commands and said operational control signals;

a power supply that is configured to convert power supplied to said processor controlled integrated power system to create converted power signals;

a memory that stores said lighting control programs;

a processor that is configured to retrieve said lighting control programs from said memory in response to said operational control signals, and generate lighting control instruction signals;

a power system controller that receives said lighting control instruction signals and said converted power signals and is configured to illuminate said light emitting diodes in response to said lighting control instruction signals.

2. The system of claim 1 further comprising:

electrical socket blades disposed on said process controlled integrated power system that are configured to be inserted into a power socket.

3. The system of claim 1 wherein said power system controller is configured to create illumination sequences of said light emitting diodes.

4. The system of claim 3 wherein said power system controller is configured to create color sequences of said light emitting diodes.

5. The system of claim 4 wherein said power system controller is configured to create fading effects of said light emitting diodes.

6. The system of claim 5 wherein said power system controller is configured to create blinking effects of said light emitting diodes.

7. The system of claim 1 wherein said power system controller is configured to create color sequences of said light emitting diodes.

8. The system of claim 1 wherein said power system controller is configured to create fading effects of said light emitting diodes.

9. The system of claim 1 wherein said power system controller is configured to create blinking effects of said light emitting diodes.

10. The system of claim 1 wherein said power system controller is configured to create current reversal in said light emitting diodes.

11. A method of controlling light emitting diodes using a processor controlled integrated power system comprising:

providing lighting control programs from a programming controller, said lighting control programs comprising a plurality of lighting control instructions to control said light emitting diodes;

transmitting said lighting control programs wirelessly from said programming controller to a receiver connected to a processor in said processor controlled integrated power system;

storing said lighting control programs in a memory that is connected to said processor in said processor controlled integrated power system;

generating lighting commands using a remote control device, said lighting commands comprising a set of operational characteristics of said light emitting diodes;

transmitting said lighting commands wirelessly from said remote control device to said receiver that is connected to said processor in said processor controlled integrated power system;

generating operational control signals from a foot switch that function to select a lighting control program, of said plurality of lighting control programs, to be transmitted to said proc or controlled integrated power system;

transmitting said operational control signals wirelessly from said foot switch to said receiver that is connected to said processor controlled integrated power system;

retrieving said lighting control programs from said memory in response to said operational control signals;

processing said lighting control programs, that are selected in response to said operational control signals, to create lighting control instructions that are transmitted from said processor to a controller;

converting power from a power supply, in response to said lighting control instructions, to create co verted power signals;

controlling application of said converted power signals to said light emitting diodes using said controller that operates in response to said lighting control instructions;

placing said receiver, said processor, said memory, said controller and said power supply in a processor controlled integrated power system package;

connecting said processor controlled integrated power system package to said light emitting diodes to illuminate said light emitting diodes in accordance with said lighting control instructions or said operational characteristics of said lighting commands.

12. The method of claim 11 further comprising:

connecting said power supply to electrical socket blades on said processor controlled integrated pow system package, that are configured to be plugged into a power socket.

13. The method of claim 11 wherein said lighting control instructions create a sequence of illumination of said light emitting diodes.

14. The method of claim 13 wherein said lighting control instructions create a sequence of colors generated by said light emitting diodes.

15. The method of claim 14 wherein said lighting control instructions create fading of said light emitting diodes.

16. The method of claim 15 wherein said lighting control instructions create blinking of said light emitting diodes.

17. The method of claim 11 wherein said lighting control instructions create a sequence of colors generated by said light emitting diodes.

18. The method of claim 11 wherein said lighting control instructions create fading of said light emitting diodes.

19. The method of claim 11 wherein said lighting control instructions create blinking of said light emitting diodes.

* * * * *